United States Patent
Pearson et al.

(10) Patent No.: US 10,093,235 B2
(45) Date of Patent: Oct. 9, 2018

(54) AUTOMOTIVE SIDE VIEW MIRROR ATTACHMENT STRUCTURE

(71) Applicant: Ford Global Technologies, LLC, Deaborn, MI (US)

(72) Inventors: Craig Pearson, Northville, MI (US); Robert Anthony Brancaleone, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/425,045

(22) Filed: Feb. 6, 2017

(65) Prior Publication Data

US 2017/0144600 A1    May 25, 2017

Related U.S. Application Data

(63) Continuation of application No. 13/329,603, filed on Dec. 19, 2011, now Pat. No. 9,669,762.

(51) Int. Cl.
*B60R 1/00* (2006.01)
*B60R 1/06* (2006.01)

(52) U.S. Cl.
CPC ............ *B60R 1/006* (2013.01); *B60R 1/06* (2013.01)

(58) Field of Classification Search
CPC .. A47F 7/14; A47G 1/16; B60R 1/025; B60R 1/08; B60R 1/06; B60R 1/006
USPC ........ 248/466–475.1, 549, 56; 359/841, 871, 359/877; 403/408.1, 335, 337
See application file for complete search history.

(56) References Cited

U.S. PATENT DOCUMENTS

| | | | | |
|---|---|---|---|---|
| 5,889,624 A * | 3/1999 | Dickenson | ............... | B60R 1/07 248/479 |
| 6,039,449 A * | 3/2000 | Dolan | .................. | B60R 1/06 359/871 |
| 6,109,586 A * | 8/2000 | Hoek | ...................... | B60R 1/076 248/476 |
| 6,637,900 B2 * | 10/2003 | Ohashi | .................. | B60R 1/06 359/838 |
| 6,664,470 B2 * | 12/2003 | Nagamoto | .......... | B60R 13/0206 16/2.1 |
| D516,479 S * | 3/2006 | Ervolina | ...................... | D12/187 |
| 7,144,125 B2 * | 12/2006 | Shinohara | ................ | B60R 1/06 359/871 |
| 7,690,615 B2 * | 4/2010 | Nakazawa | .............. | B60R 1/06 248/466 |

(Continued)

FOREIGN PATENT DOCUMENTS

| | | |
|---|---|---|
| JP | 11105627 | 4/1999 |
| JP | 11129761 | 5/1999 |
| JP | 2005153749 | 6/2005 |

*Primary Examiner* — Muhammad Ijaz
(74) *Attorney, Agent, or Firm* — Jason Rogers; Price Heneveld LLP

(57) ABSTRACT

An automotive side view mirror attachment assembly includes first and second loading surfaces for engaging a mounting member of a side view mirror assembly, wherein the first and second loading surfaces are disposed within an interior of a vehicle door, such that, in assembly, a mounting member of the mirror assembly is substantially or fully disposed within the interior of a vehicle door, thereby minimizing the overall mirror footprint by eliminating the need for an external base for attachment of a mirror assembly to a vehicle door.

8 Claims, 5 Drawing Sheets

(56) References Cited

U.S. PATENT DOCUMENTS

| | | | |
|---|---|---|---|
| 7,699,285 B2* | 4/2010 | Brancaleone | B60R 1/06 248/475.1 |
| 9,669,762 B2* | 6/2017 | Pearson | B60R 1/06 |
| 2004/0026592 A1* | 2/2004 | Okamoto | B60R 1/06 248/475.1 |
| 2004/0129853 A1* | 7/2004 | Suzuki | B60Q 1/2665 248/475.1 |
| 2004/0264011 A1* | 12/2004 | Lynam | B60R 1/08 359/866 |
| 2005/0141111 A1 | 6/2005 | Yoshida | |
| 2008/0310041 A1* | 12/2008 | Sinelli | B60R 1/025 359/879 |
| 2009/0225459 A1* | 9/2009 | Brancaleone | B60R 1/06 359/871 |
| 2010/0064592 A1* | 3/2010 | Ohe | B60J 5/0404 49/502 |
| 2012/0229882 A1* | 9/2012 | Fish, Jr. | B60R 1/025 359/267 |
| 2013/0153736 A1* | 6/2013 | Pearson | B60R 1/06 248/475.1 |

\* cited by examiner

AUTOMOTIVE SIDE VIEW MIRROR ATTACHMENT STRUCTURE

CROSS-REFERENCE TO RELATED APPLICATION

The present application is a continuation of U.S. patent application Ser. No. 13/329,603 (now U.S. Pat. No. 9,669,762), filed Dec. 19, 2011, entitled "AUTOMOTIVE SIDE VIEW MIRROR ATTACHMENT STRUCTURE", the entire disclosure of which is hereby incorporated herein by reference.

FIELD OF THE INVENTION

The present invention generally relates to an automotive side view mirror attachment assembly and, more specifically, an internal side view mirror attachment assembly for attaching a side view mirror to an outer skin of a vehicle door while minimizing the overall mirror footprint.

BACKGROUND OF THE INVENTION

In automotive styling, it is desirable to mount a side view mirror on a vehicle door's outer skin and minimize the mirror footprint to provide sleek stylization of the side view mirror as attached to the door panel. Historically, as the mirror footprint is minimized, it becomes more difficult to provide enough door structure to prevent the mirror from shaking and vibrating in use. This results in a bulky mirror-mounting structure being necessary to properly secure a mirror assembly to a door skin. A bulky mirror-mounting structure is more likely to cause vibrations during vehicle travel as well as increase aerodynamic drag on the mirror assembly.

Thus, there is a desire to provide a mounting system for a side view mirror on a door panel to fully support the mirror under abusive loading, where the mirror assembly has a minimized mounting footprint with sufficient loading performance, wherein the mirror-mounting assembly also exhibits reduced vibration in use.

SUMMARY OF THE INVENTION

According to one aspect of the present invention, an internal side view mirror-mounting system for a vehicle door comprises a mirror-mounting reinforcement member operably coupled to an inner panel disposed in the interior of a vehicle door and having a depression with reinforcement apertures disposed thereon providing a first mirror loading surface. A belt reinforcement member is operably coupled to the mirror-mounting reinforcement member and further comprises a mounting aperture, which, in assembly, is aligned with the reinforcement apertures and allows for external access to the reinforcement apertures as disposed on the first mirror loading surface. A reinforcement flange is disposed about the mounting aperture thereby providing a second mirror loading surface.

Another aspect of the present invention includes an internal side view mirror-mounting system for a vehicle door comprising a mirror-mounting reinforcement member operably coupled to an inner panel of a vehicle door. The mirror-mounting reinforcement member includes an indented mirror-mounting surface with reinforcement apertures disposed thereon for providing a first mirror loading surface. A belt reinforcement member is operably coupled to the mirror-mounting reinforcement member having a mounting aperture aligned with the mirror-mounting surface, and a reinforcement flange is disposed about the mounting aperture thereby providing a second mirror loading surface.

Yet another aspect of the present invention includes a mirror-mounting system for a vehicle door having a mirror-mounting reinforcement member including a first portion laterally spaced apart from a second portion. The first portion includes a primary mounting surface. A connecting member operably connects the first portion and the second portion of the mirror-mounting reinforcement member and provides a secondary mounting surface. A mirror assembly having a mounting member is adapted to engage the primary mounting surface and wedgingly engage the secondary mounting surface in assembly.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
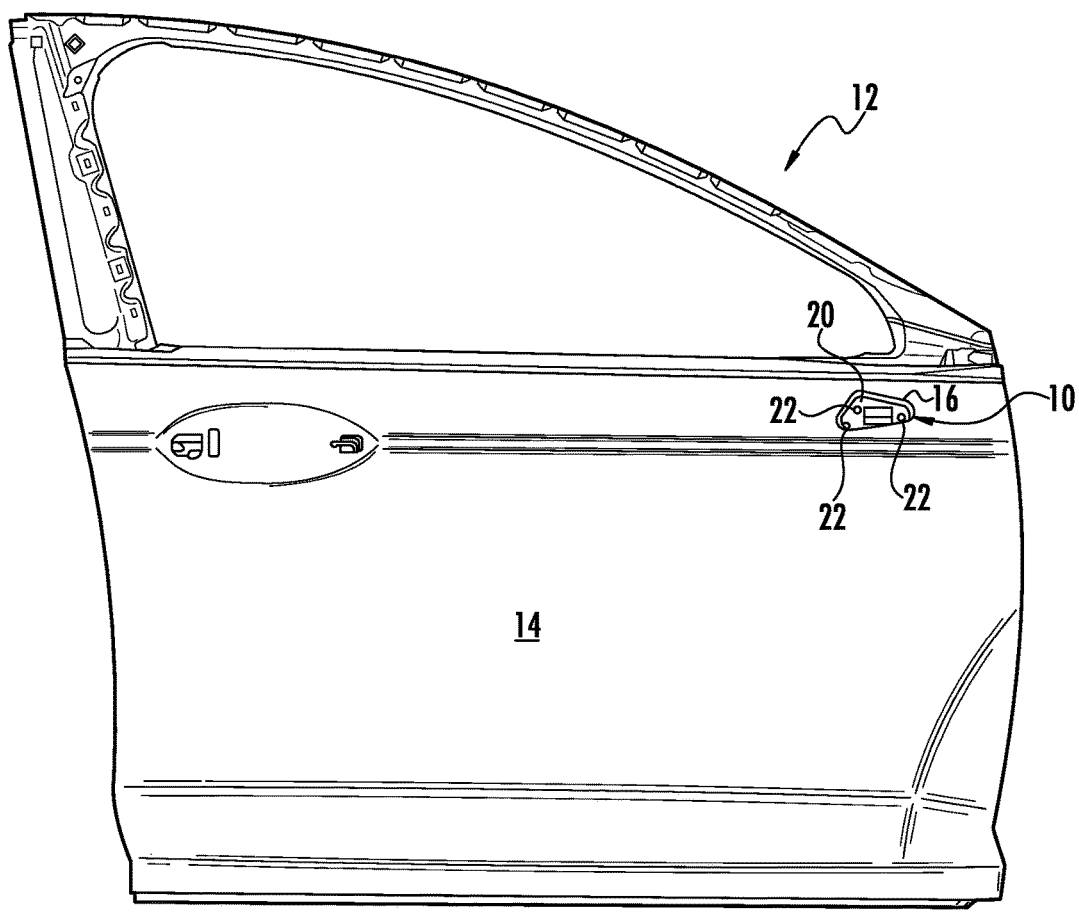
FIG. 1 is a side elevational view of a vehicle door assembly with a mirror-mounting assembly of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring to FIG. 1, the reference numeral 10 generally designates an internal side view mirror-mounting system according to one embodiment of the present invention. In FIG. 1, aspects of the mirror-mounting system 10 are shown disposed in an interior of a vehicle door 12 having an outer skin or panel 14 with an aperture 16 disposed thereon revealing features of the mirror-mounting system 10. As revealed through aperture 16 in the outer skin 14 of the vehicle door 12, a mirror-mounting reinforcement member 20 is disposed in spaced-apart relationship behind outer skin 14 and includes reinforcement apertures 22 disposed thereon. In assembly, the reinforcement apertures 22 are aligned with aperture 16 of the outer skin 14 to provide access to the reinforcement apertures 22 through aperture 16.

Figure 2:
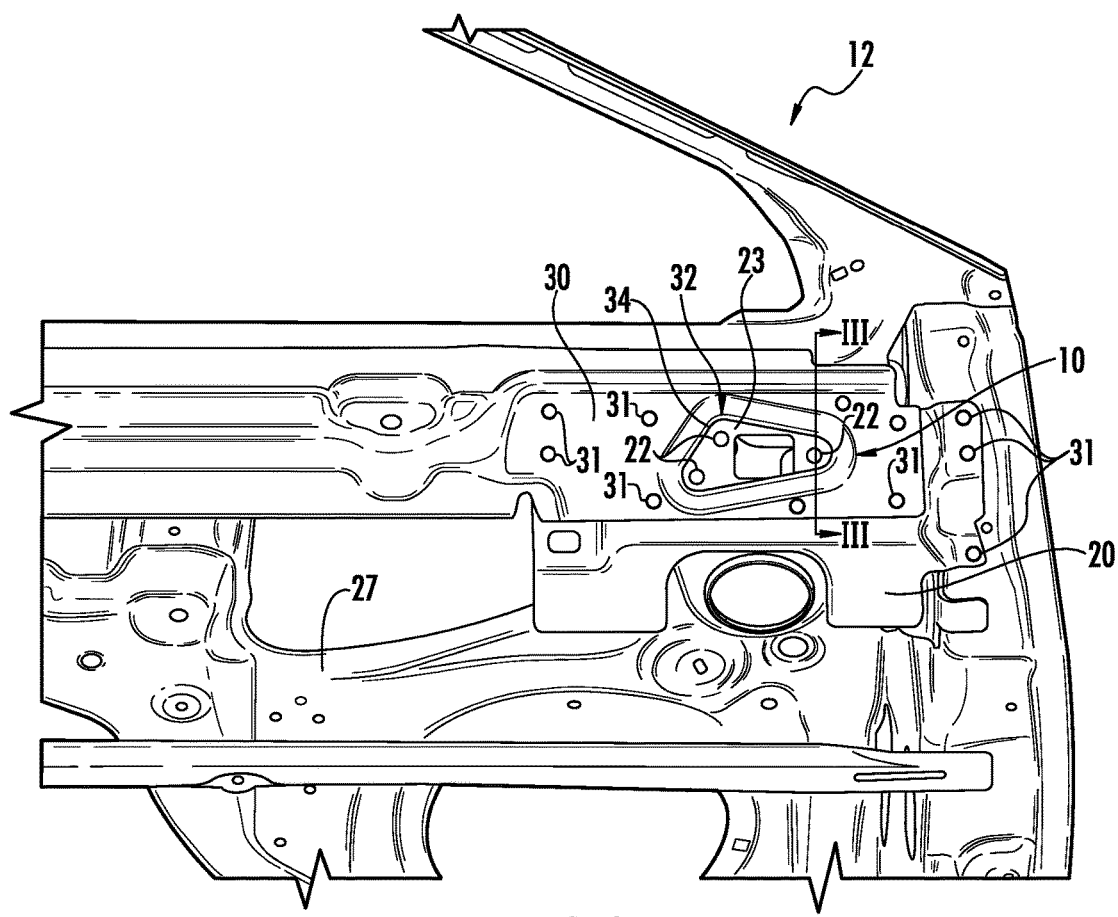
FIG. 2 is a fragmented side elevational view of an interior of a vehicle door with a mirror-mounting assembly.

Referring now to FIG. 2, the vehicle door 12 is shown with the outer skin or panel (14) removed to reveal an inner door panel 27 with the mirror-mounting reinforcing member 20 operably coupled thereto. The mirror-mounting reinforcing member 20 is further coupled to an outer belt reinforcement member 30. In the embodiment shown in FIG. 2, the inner door panel 27 is operably coupled to the mirror-mounting reinforcing member 20 by means known in the art, such as spot-welds, identified at spot-weld locations 31. Further, the outer belt reinforcement member 30 is operably coupled to the mirror-mounting reinforcement member 20 at spot-weld locations 31. The outer belt reinforcement member 30 further comprises a mounting aperture 32 which, in assembly, aligns with aperture 16 of the outer panel 14 of the vehicle door 12. The mounting aperture 32 is configured to align with and allow access to the reinforcement apertures 22 as disposed on a first loading surface 23 of the mirror-mounting reinforcement member 20. The first loading surface 23 of the mirror-mounting reinforcement member 20 is generally disposed in a spaced-apart relationship relative to the outer belt reinforcement member 30, as further described below. In assembly, the mounting aperture 32 of the outer belt reinforcement member 30 is adapted to receive a wedged mounting member of a mirror assembly as further described with reference to FIG. 3.

Figure 3:
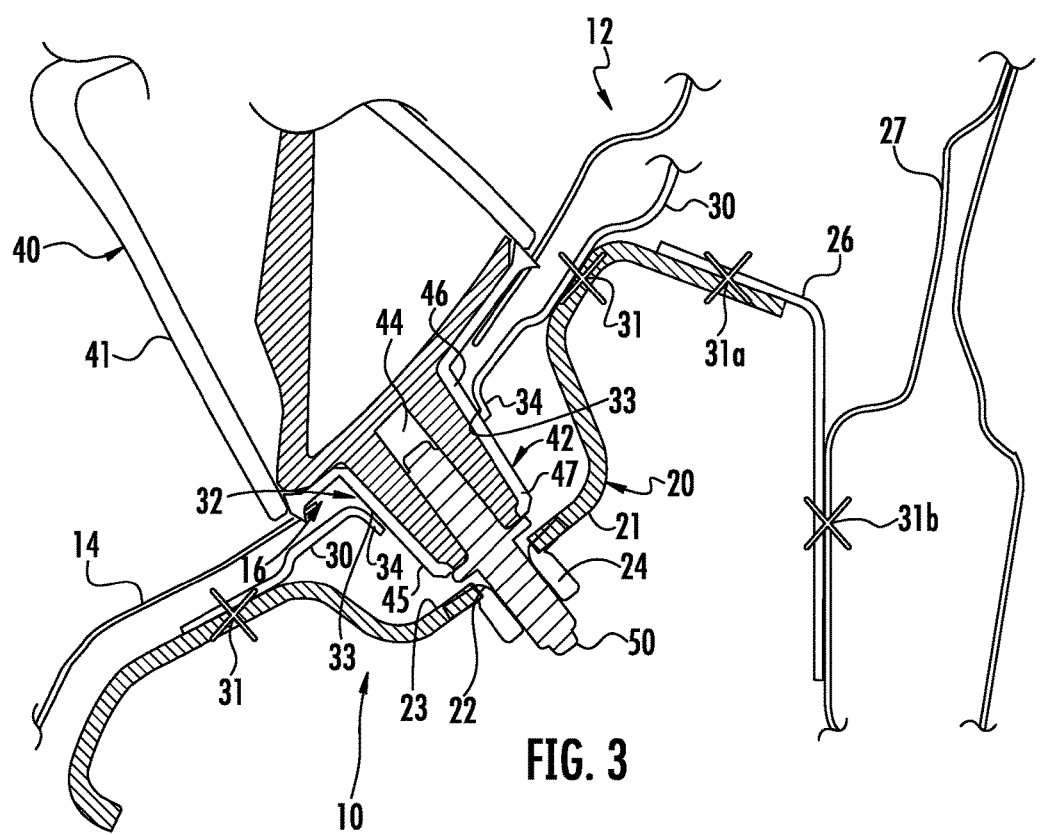
FIG. 3 is a cross-sectional view of a mirror attached to a vehicle door, taken along line III, as shown in FIG. 2.

As shown in FIG. 3, one embodiment of the present invention comprises a two sheet metal stamping configuration made up of the mirror-mounting reinforcement member 20 and the outer belt reinforcement 30. As shown in FIG. 3, the mirror-mounting reinforcement member 20 has a depression or an indented mirror-mounting surface 21, such that the mirror-mounting reinforcement member 20 and the belt reinforcement member 30 are configured in a spaced-apart relationship with regard to the depression or indented mirror-mounting surface 21. A top surface of the indented mirror-mounting surface 21 defines the first or primary loading surface 23 of the mirror-mounting assembly 10 where the reinforcement aperture are disposed. The mirror-mounting reinforcement member 20, as shown in FIG. 3, is operably coupled to the outer belt reinforcement member 30 at spot weld locations 31. The mirror-mounting reinforcement member 20 is further coupled to a mounting bracket 26 at spot weld location 31a, which is further coupled to the inner door panel 27 at spot weld location 31b.

A mirror assembly 40 is shown disposed adjacent to the outer panel 14 of the vehicle door 12. The mirror assembly 40 comprises at least one wedged mounting member 42 having a side wall 45 with a proximal end 46 and a distal end 47, wherein the proximal end 46 is disposed adjacent the mirror assembly 40 and is generally wider than distal end 47, such that the wedged mounting member 42 gradually tapers along side wall 45 from proximal end 46 to distal end 47 giving the wedged mounting member 42 a wedge configuration. The wedged mounting member 42 further comprises a mounting channel 44 which, in assembly, receives a fastener 50 to attach the mirror assembly 40 to the mirror-mounting reinforcement member 20 at the first loading surface 23 disposed on the indented mirror-mounting surface 21.

As shown in FIG. 3, the depression or indented mirror-mounting surface 21 further comprises reinforcement apertures 22, which have fastener engagement members 24 for engaging the fastener 50 in assembly. The engagement of the fastener 50 to the fastener engagement members 24 of the reinforcement apertures 22 as disposed on the indented mirror-mounting surface 21 of the mirror-mounting reinforcement member 20 provides a first or primary loading surface 23 for the mirror assembly 40. Thus, the at least one mounting member 42 of the mirror assembly 40 is coupled to the first loading surface 23 via the fastener assembly 50, which is operably coupled to the channel 44 of the mounting member on one end and further coupled to at least one of the reinforcement apertures 22 disposed on the first loading surface 23.

As further shown in FIG. 3, the outer belt reinforcement member 30 engages the wedged mounting member 42 of the mirror assembly 40 at mounting aperture 32. Specifically, the mounting aperture 32 has an inwardly protruding reinforcement flange 34 disposed about a rim of the mounting aperture 32. The reinforcement flange 34 slightly tapers inwardly and is configured to wedgingly engage the wedged mounting member 42 of the mirror assembly 40. In this way, the reinforcement flange 34 provides a wedged second or secondary loading surface 33 for the mirror assembly 40. Thus, in assembly, the mirror assembly 40 is loaded onto the door panel 12 at the outer skin 14 by inserting the wedged mounting member 42 of the mirror assembly 40 through aperture 16 in the outer skin 14 of the vehicle door 12. The wedged mounting member 42 of the mirror assembly 40 is then inserted into the mirror-mounting aperture 32 of the outer belt reinforcement member 30 where the wedged mounting member 42 wedgingly engages reinforcement flange 34 disposed about a rim of the mirror-mounting aperture 32 at a second loading surface 33. The wedged mounting member 42 is further connected to the mirror-mounting reinforcement member 20 at the indented mirror-mounting surface 21 via fastener 50, which engages the wedged mounting member 42 at channel 44 on one end and engages a reinforcement aperture 22 disposed on the indented mirror-mounting surface 21 at the other end. In this way, the fastener connection of the mounting member 42 to the indented mirror-mounting surface 21 of the mirror-mounting reinforcement member 20 provides a primary or first loading surface 23 for the mirror assembly 40. As noted above, the wedged engagement of the mounting member 42 with flange 34 disposed about the mirror-mounting apertures 32 of the outer belt reinforcement member 30 provides a secondary loading surface for the mirror assembly 40. It has been discovered that providing a primary loading surface 23 and a secondary loading surface 33, (in the form of a wedged engagement as described above) for the mounting member 42 to engage, spreads out the loads that act on the mirror assembly 40, such that the mirror assembly 40 is securely engaged with the vehicle door 12 without the need for a large or bulky mirror base as commonly found in traditional mirror-mounting systems.

Thus, the configuration as shown in FIG. 3 reduces the overall mirror assembly footprint by securely engaging the mirror assembly 40 to the vehicle door 12 without the need for a mirror base. Specifically, as shown in FIG. 3 a housing 41 of the mirror assembly 40 is disposed directly adjacent to the outer skin or panel 14 of the vehicle door 12. Thus, the mirror-mounting system 10 is fully disposed within an interior of the vehicle door 12, and there is no external mounting member. Using the secondary loading surface, it has been found that, not only is the mirror footprint minimized, but the bolt spacing is also minimized. Specifically, a mirror assembly, such as mirror assembly 40 shown in FIG. 3, may have a plurality of wedged mounting members 42 which engage the indented mirror-mounting surface 21 of the mirror-mounting reinforcement member 20 and further engage the flange 34 disposed about the mirror-mounting aperture 32 of the outer belt reinforcement member 30. With the primary and secondary loading surfaces 23, 33 positively retaining the mirror assembly 40, it has been discovered that the spacing of the reinforcement apertures 22 on the indented mirror-mounting surface 21 of the mirror-mounting reinforcement member 20 is minimized.

For example, in the configuration shown in FIG. 2, the mirror-mounting aperture 32 of the outer bolt reinforcement member 30 is configured in a generally triangular formation. The reinforcement apertures 22 disposed on the indented mirror-mounting surface 21 of the mirror-mounting reinforcement member 20 are accessible through mirror-mounting aperture 32 of the outer belt reinforcement member 30 and are specifically disposed in the three corners of the triangular configuration of the mirror-mounting aperture 32. Thus, a mirror assembly engaging the door panel 12, as shown in FIG. 2, would comprise a plurality of wedged mounting members, such as wedged mounting member 42 shown in FIG. 3, all of which would engage the reinforcement apertures 22 disposed on the indented mirror-mounting surface 21 as a first loading surface 23 and further engage flange 34 disposed about mirror-mounting aperture 32 in a wedging engagement configuration providing a second loading surface 33 for the mirror assembly 40. In this way, the mirror assembly 40 has a triangulation of forces acting on the first loading surface 23, which is, essentially, the top surface of the indented mirror-mounting surface 21, and a triangulation of forces acting on the second loading surface 33, which is the wedged flange 34 disposed about the mirror-mounting aperture 32. Positively capturing the mirror assembly 40 in this way provides a stable mirror attachment with enough door structure to prevent mirror shake and vibration and support the mirror assembly under abusive loading, all while reducing the overall mirror footprint as compared to other mirror-mounting systems.

Figure 4:
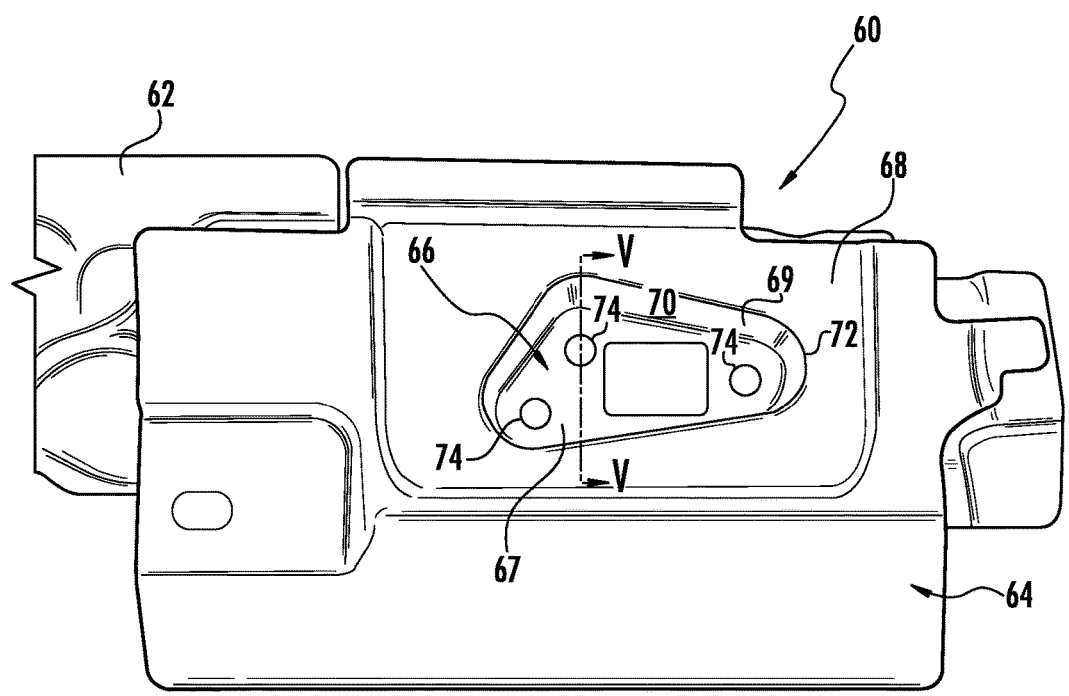
FIG. 4 is a side elevational view of a mirror-mounting assembly according to another embodiment of the present invention.

In the embodiment shown in FIG. 4, the referenced numeral 60 generally designates the internal components of a side view mirror-mounting system. As shown in FIG. 4, an inner door panel 62, disposed within an interior of a vehicle door, is operably coupled to a mirror-mounting reinforcement member 64. The mirror-mounting reinforcement member 64 has a first portion 66 with reinforcement apertures 74 disposed thereon for connecting the mirror-mounting reinforcement member 64 to a mirror assembly as further described below. The first portion 66 of the mirror-mounting reinforcement member 64 provides a primary or first loading surface 67 where the reinforcement apertures 74 are disposed. The mirror-mounting reinforcement member 64 further comprises a second portion 68 which is laterally spaced-apart from the first portion 66, such that, in the configuration shown in FIG. 4, the first portion 66 appears to be an indented area with reference to the second portion 68. As the first portion 66 and second portion 68 are laterally spaced-apart, a connecting member 69 is disposed therebetween connecting the first and the second portions and providing a second or secondary loading surface for a mirror assembly. Thus, the mirror-mounting reinforcement member 64 can be a unitary member, such as a casting, containing both the primary loading surface 67 and the secondary loading surface 70. As shown in FIG. 4, the mirror-mounting reinforcement member 64 appears as a unitary casting or stamped member. A mounting aperture 72 is disposed on the second portion 68 of the mirror-mounting reinforcement member 64. The connecting member 69 can be a wedge connecting member beginning at the mounting aperture 72 and tapering inwardly until it reaches the first portion 66 of the mirror-mounting reinforcement member 64. In this way, a wedge connecting member 69 connects the first portion with the second portion in a tapered fashion to provide a secondary loading surface 70, which can wedgingly engage a mounting member of a mirror assembly as further described below.

Figure 5:
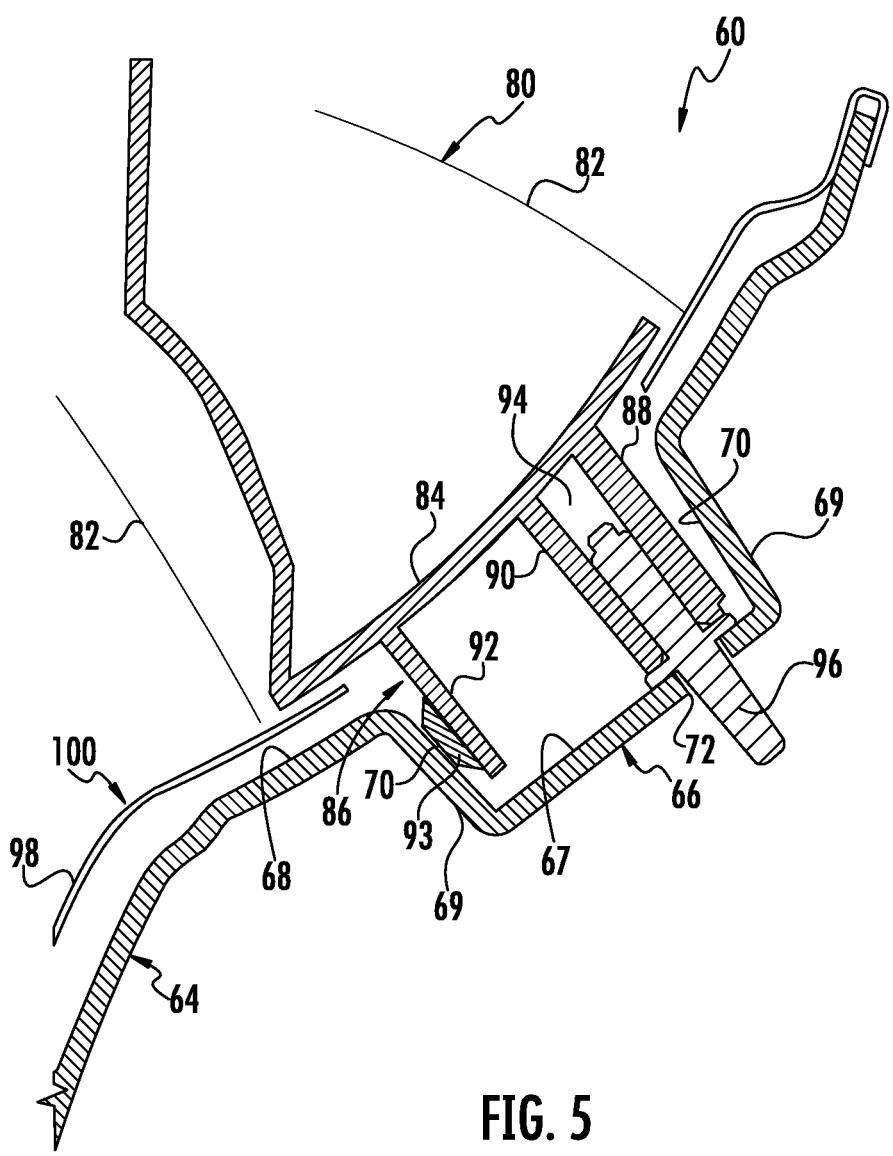
FIG. 5 is a cross-sectional of a mirror mounted to a vehicle door, taken along line V, as shown in FIG. 4.

As shown in FIG. 5, a mirror assembly 80 is shown having a housing 82 and a mirror base 84. Disposed off the mirror base 84 is a mirror-mounting member 86, which, in this embodiment, comprises side walls 88, 90, and 92. Side walls 88 and 90, in this embodiment, define a channel 94 which is adapted to engage a fastener 96, wherein the fastener 96 further engages a mounting aperture 72 disposed on the primary loading surface 67 of the first portion 66 of the mirror-mounting reinforcement member 64. In this way, the mounting member 86 engages the primary loading surface 67. Side wall 92 has an exterior wedged flange 93 disposed thereon which engages the connecting member 69 at a secondary loading surface 70. In this way, wedged flange 93 disposed on the exterior of side wall 92 wedgingly engages the second loading surface 70 of the connecting member 69 of the mirror-mounting reinforcement member 64. As further shown in FIG. 5, the mirror assembly housing 82 and the mirror base 84 are disposed directly adjacent an outer panel 98 of a vehicle door 100. Thus, as with the embodiments described above, the mounting member is substantially disposed within an interior of the vehicle door 100. There is no external mounting member, thereby reducing the mirror footprint while providing primary and secondary loading surfaces to rigidly retain the mirror assembly 80 in place during use.

Therefore, in the embodiment shown in FIGS. 4 and 5, the mounting member 86 can be a wedged mounting member which wedgingly engages a wedged connecting member 69, thereby providing a wedging engagement of mounting member 86 and the secondary loading surface 70. Further, the connecting member 69 can have an overall configuration which is not wedged, and wherein the mounting member 86 comprises a wedged flange 93 disposed on an external side wall 92 for providing a wedging engagement of the mounting member 86 with the secondary loading surface 70.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A mirror-mounting system for a vehicle door, comprising:
 a mirror-mounting reinforcement member including a first portion laterally spaced-apart from a second portion, wherein the first portion defines a primary loading surface, and further wherein the mirror-mounting reinforcement member is substantially disposed in an interior of the vehicle door in assembly;
 a connecting member connecting the first portion and second portion, wherein the connecting member defines a secondary loading surface; and
 a mirror assembly having a base portion operably coupled to the primary loading surface and wedgingly engaged with the secondary loading surface.

2. The mirror-mounting system of claim 1, wherein the connecting member is tapered inwardly from the second portion of the mirror-mounting reinforcement member to the first portion of the mirror-mounting reinforcement member.

3. The mirror-mounting system of claim 2, wherein the base portion of the mirror assembly further comprises a channel.

4. The mirror-mounting system of claim 3, including:
a fastener, wherein the fastener is operably coupled to the channel of the base portion of the mirror assembly and further coupled to a mounting aperture disposed through the primary loading surface.

5. A mirror-mounting system for a vehicle door, comprising:
a mirror-mounting reinforcement member including a first portion spaced-apart from and interconnected to a second portion by an intermediate connecting member, wherein the intermediate connecting member is tapered inwardly from an outer portion to an inner portion thereof, wherein the first portion defines a primary loading surface, and further wherein the intermediate connecting member defines a secondary loading surface; and
a mirror assembly having a base portion operably coupled to the primary loading surface, wherein the base portion includes a sidewall having an outwardly extending wedged flange wedgingly engaged with the secondary loading surface.

6. The mirror-mounting system of claim 5, wherein the primary loading surface includes one or more mounting apertures disposed therethrough.

7. The mirror-mounting system of claim 6, wherein the base portion of the mirror assembly further comprises at least one channel adapted to receive a fastener for operably coupling the mounting member to the primary loading surface at the one or more mounting apertures.

8. The mirror-mounting system of claim 7, wherein the mirror-mounting reinforcement member is substantially disposed in an interior of the vehicle door in assembly.

\* \* \* \* \*